United States Patent
Yokoyama et al.

(10) Patent No.: US 11,807,244 B2
(45) Date of Patent: Nov. 7, 2023

(54) VEHICLE CONTROL DEVICE, NON-TRANSITORY STORAGE MEDIUM, AND VEHICLE CONTROL SYSTEM

(71) Applicant: TOYOTA JIDOSHA KABUSHIKI KAISHA, Aichi-ken (JP)

(72) Inventors: Daiki Yokoyama, Gotemba (JP); Yoshiyuki Kageura, Shizuoka-ken (JP); Masanori Shimada, Susono (JP); Yoshihiro Sakayanagi, Mishima (JP); Hiroki Morita, Hiratsuka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 37 days.

(21) Appl. No.: 17/829,367

(22) Filed: Jun. 1, 2022

(65) Prior Publication Data
US 2022/0388517 A1     Dec. 8, 2022

(30) Foreign Application Priority Data

Jun. 7, 2021    (JP) ............................. 2021-095350

(51) Int. Cl.
*B60W 40/068* (2012.01)
*B60W 50/08* (2020.01)
*H04W 4/021* (2018.01)

(52) U.S. Cl.
CPC ........ *B60W 40/068* (2013.01); *B60W 50/082* (2013.01); *H04W 4/021* (2013.01);
(Continued)

(58) Field of Classification Search
CPC ...... B60W 40/00; B60W 40/06; B60W 50/08; B60W 50/082
See application file for complete search history.

(56) References Cited

U.S. PATENT DOCUMENTS 4,702,341 A * 10/1987 Taga .................. B60K 23/0808
701/69
5,713,642 A * 2/1998 Okazaki ............. B60T 8/17616
303/177
(Continued)

FOREIGN PATENT DOCUMENTS

JP          H775210 A     3/1995

OTHER PUBLICATIONS

BMW's PHV automatically switches to EV mode in the electric vehicle zone in Europe from this summer, Automotive Media Response, URL: https://response.jp/article/2020/06/23/335863.html, retrieved Mar. 28, 2022, 3pp.
(Continued)

*Primary Examiner* — John Kwon
(74) *Attorney, Agent, or Firm* — HAUPTMAN HAM, LLP (57) ABSTRACT

A vehicle control device configured to control switching of drive mode of a vehicle including an internal combustion engine and a motor includes a processor configured to switch, in a case where a road surface of a perimeter of a geofencing zone is a road surface on which there is a high probability that the vehicle slips, in a movement route from an outside of the geofencing zone to an inside of the geofencing zone, the drive mode of the vehicle to drive by the motor in a state in which there is a low probability that the vehicle slips, outside the geofencing zone.

20 Claims, 4 Drawing Sheets

(52) U.S. Cl.
CPC ..... *B60W 2520/26* (2013.01); *B60W 2552/40* (2020.02); *B60W 2555/20* (2020.02)

(56) References Cited

U.S. PATENT DOCUMENTS

| | | | | |
|---|---|---|---|---|
| 2004/0040759 A1* | 3/2004 | Shimizu | ............... | F16D 48/06 180/65.265 |
| 2004/0204803 A1* | 10/2004 | Matsuda | ............... | B60L 50/11 903/906 |
| 2013/0274980 A1* | 10/2013 | Takamura | ............ | F16D 48/066 701/67 |
| 2016/0280064 A1* | 9/2016 | Nozu | ............... | F16D 48/06 |
| 2019/0061524 A1* | 2/2019 | Nozu | ............... | F16D 13/52 |
| 2022/0055475 A1* | 2/2022 | Hirosumi | ............ | B60K 17/356 |

OTHER PUBLICATIONS

Hirokazu Kasakabe, The PHEV engine automatically stops when entering the internal combustion engine prohibited area Fiat and Turin City Joint Experiment, engadget, Turin City Demonstration Experiment, URL: https://japanese.engadget.com/fiat-plug-in-hybrids-electric-only-mode-023051538.html, Japan, 6pp.
Mercedes-Benz, Geofencing, retrieved Mar. 28, 2022, 3pp.
Provide contextual experiences when users enter or leave an area of interest, Geofencing API, Google Developers, URL: https://developers.google.com/location-context/geofencing, retrieved Mar. 28, 2022, 2pp.

* cited by examiner

VEHICLE CONTROL DEVICE, NON-TRANSITORY STORAGE MEDIUM, AND VEHICLE CONTROL SYSTEM

CROSS-REFERENCE TO RELATED APPLICATION

This application claims priority to Japanese Patent Application No. 2021-095350 filed on Jun. 7, 2021, incorporated herein by reference in its entirety.

BACKGROUND

1. Technical Field

The present disclosure relates to a vehicle control device, a non-transitory storage medium, and a vehicle control system.

2. Description of Related Art

Japanese Unexamined Patent Application Publication No. 7-75210 (JP 7-75210 A) discloses that, in order to restrain the influence of exhaust gas, the internal combustion engine of a vehicle is stopped and the vehicle travels by the power of a motor using a battery in an air pollution reduction enhanced area. As described above, it is known to set a geofencing zone that restricts the power of travel to solely the battery in order to restrain the adverse effect on the environment.

SUMMARY

Incidentally, at the perimeter of the geofencing zone, drive by the internal combustion engine is switched to drive by the motor, for example, when the vehicle moves from the outside of the zone to the inside of the zone. In this case, when the drive mode is switched in a case where the road surface is in a slip-prone state, such as in rainy weather, there is a probability that the vehicle slips.

The present disclosure provides a vehicle control device, a non-transitory storage medium, and a vehicle control system capable of restraining the slip of a vehicle when drive by an internal combustion engine is switched to drive by a motor.

A first aspect of the present disclosure relates to a vehicle control device configured to control switching of a drive mode of a vehicle including an internal combustion engine and a motor. The vehicle control device includes a processor configured to switch, in a case where a road surface of a perimeter of a geofencing zone is a road surface on which there is a high probability that the vehicle slips, in a movement route from an outside of the geofencing zone to an inside of the geofencing zone, the drive mode of the vehicle to drive by the motor in a state in which there is a low probability that the vehicle slips, outside the geofencing zone. The geofencing zone is set by a virtual perimeter in which travel of the vehicle is restricted to travel by a power of the motor.

In the aspect, the processor may be configured to switch the drive mode of the vehicle to the drive by the motor at a position where is outside the geofencing zone and where there is a low probability that the vehicle slips.

In the aspect, the processor may be configured to switch the drive mode of the vehicle to the drive by the motor at a position outside the geofencing zone and closest to the geofencing zone, out of positions where there is a low probability that the vehicle slips.

In the aspect, the processor may be configured to switch the drive mode of the vehicle to the drive by the motor while the vehicle is stopped at a position outside the geofencing zone.

In the aspect, the processor may be configured to control a switching position to the drive by the motor in the vehicle to a position where there is a low probability that the vehicle slips, in a case where a travel route is set in the vehicle and the travel route passes through the geofencing zone.

In the aspect, the processor may be configured to determine whether or not a road surface on the travel route is the road surface on which there is the high probability that the vehicle slips, based on the travel route set in the vehicle and road surface information acquired in the vehicle.

In the aspect, the road surface information may be based on at least one of an amount of rainfall, an amount of wiper operation, and road alignment.

A second aspect of the present disclosure relates to a non-transitory storage medium storing instructions that are executable by a processor of a vehicle control device that is configured to control switching of a drive mode of a vehicle including an internal combustion engine and a motor, the instructions causing the processor to perform the following functions. The functions include switching, in a case where a road surface of a perimeter of a geofencing zone is a road surface on which there is a high probability that the vehicle slips, in a movement route from an outside of the geofencing zone to an inside of the geofencing zone, the drive mode of the vehicle to drive by the motor in a state in which there is a low probability that the vehicle slips, outside the geofencing zone. The geofencing zone is set by a virtual perimeter in which travel of the vehicle is restricted to travel by a power of the motor.

In the aspect, in the switching to the drive by the motor, the drive mode of the vehicle may be switched to the drive by the motor at a position where is outside the geofencing zone and where there is a low probability that the vehicle slips.

In the aspect, in the switching to the drive by the motor, the drive mode of the vehicle may be switched to the drive by the motor at a position outside the geofencing zone and closest to the geofencing zone, out of positions where there is a low probability that the vehicle slips.

In the aspect, in the switching to the drive by the motor, the drive mode of the vehicle may be switched to the drive by the motor while the vehicle is stopped at a position outside the geofencing zone.

In the aspect, in the switching to the drive by the motor, a switching position to the drive by the motor in the vehicle may be controlled to a position where there is a low probability that the vehicle slips, in a case where a travel route is set in the vehicle and the travel route passes through the geofencing zone.

In the aspect, the functions may further include determining whether or not a road surface on the travel route is the road surface on which there is the high probability that the vehicle slips, based on the travel route set in the vehicle and road surface information acquired in the vehicle.

A third aspect of the present disclosure relates to a vehicle control system. The vehicle control system includes a vehicle and a vehicle control device. The vehicle includes an internal combustion engine and a motor. The vehicle control device includes a processor. The processor is configured to switch, in a case where a road surface of a perimeter of a geofencing zone is a road surface on which there is a high probability that the vehicle slips, in a movement route from an outside of the geofencing zone to an inside of the geofencing zone, the drive mode of the vehicle to drive by the motor in a state in which there is a low probability that the vehicle slips, outside the geofencing zone. The geofencing zone is set by a virtual perimeter in which travel of the vehicle is restricted to travel by a power of the motor.

In the aspect, the processor may be configured to switch the drive mode of the vehicle to the drive by the motor at a position where is outside the geofencing zone and where there is a low probability that the vehicle slips.

In the aspect, the processor may be configured to switch the drive mode of the vehicle to the drive by the motor at a position outside the geofencing zone and closest to the geofencing zone, out of positions where there is a low probability that the vehicle slips.

In the aspect, the processor may be configured to switch the drive mode of the vehicle to the drive by the motor while the vehicle is stopped at a position outside the geofencing zone.

In the aspect, the processor may be configured to control a switching position to the drive by the motor in the vehicle to a position where there is a low probability that the vehicle slips, in a case where a travel route is set in the vehicle and the travel route passes through the geofencing zone.

In the aspect, the processor may be configured to determine whether or not a road surface on the travel route is the road surface on which there is the high probability that the vehicle slips, based on the travel route set in the vehicle and road surface information acquired in the vehicle.

In the aspect, the road surface information may be based on at least one of an amount of rainfall, an amount of wiper operation, and road alignment.

According to the present disclosure, it is possible to restrain the slip of the vehicle when the drive by the internal combustion engine is switched to the drive by the motor.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In all the drawings of the following embodiments, the same or corresponding portions are designated by the same reference numerals. Further, the present disclosure is not limited to the embodiments described below.

Embodiment 1

Figure 1:
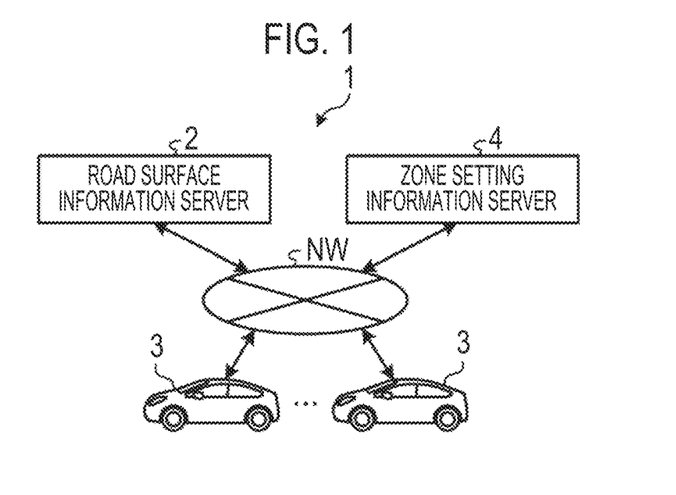
FIG. 1 is a diagram schematically showing a control system according to Embodiment 1.
Figure 2:
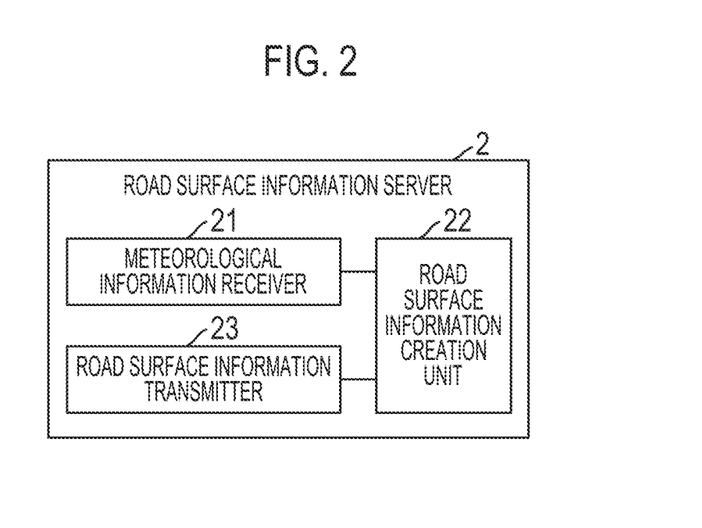
FIG. 2 is a block diagram illustrating a configuration of a road surface information server according to Embodiment 1.
Figure 3:
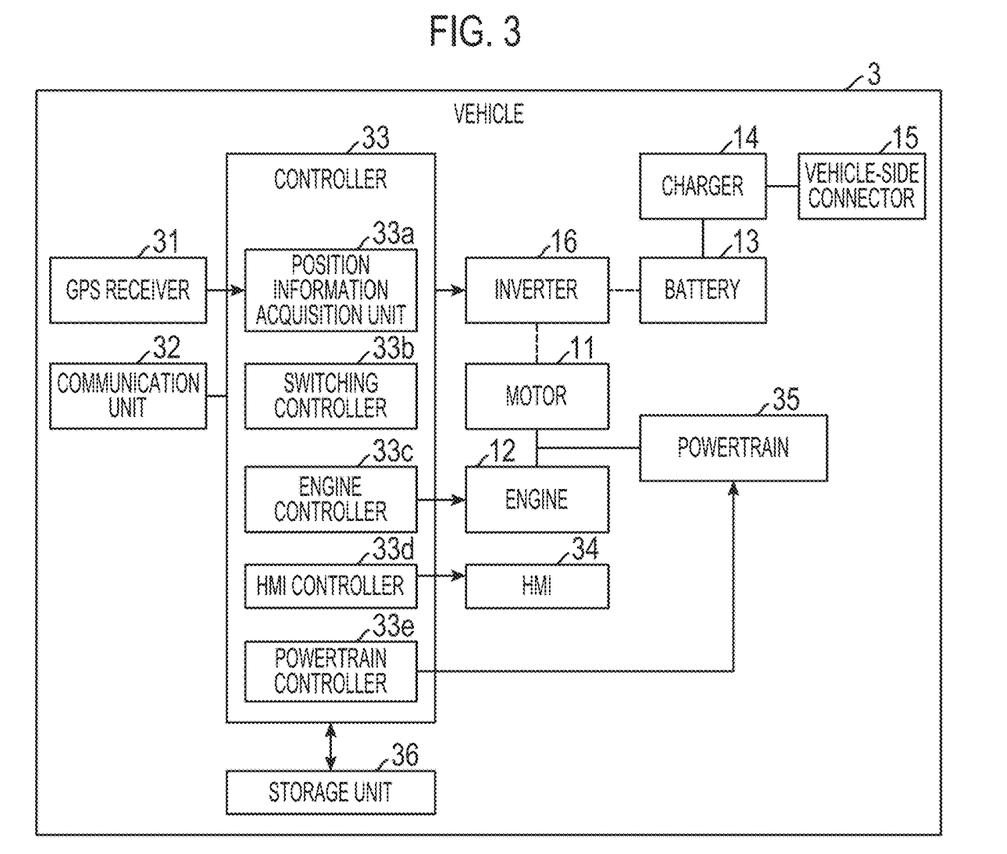
FIG. 3 is a block diagram illustrating a configuration of a vehicle according to Embodiment 1.

FIG. 1 is a diagram schematically showing a control system according to Embodiment 1. FIG. 2 is a block diagram illustrating the configuration of a road surface information server according to Embodiment 1. FIG. 3 is a block diagram illustrating the configuration of a vehicle according to Embodiment 1. A control system 1 according to Embodiment 1 includes a road surface information server 2, a vehicle 3, and a zone setting information server 4. The road surface information server 2 is a server that acquires and outputs, for example, meteorological information disclosed by the Meteorological Agency or a business operator engaged in meteorological services. The vehicle 3 is a vehicle capable of traveling solely by the power of a motor (capable of EV traveling), such as a plug-in hybrid electric vehicle or a range extender vehicle. Further, the vehicle 3 is a vehicle capable of charging electric power from an external power source and supplying electric power to the outside.

The road surface information server 2, the vehicle 3, and the zone setting information server 4 can perform information communication via a network NW. The network NW is formed of, for example, the network of the Internet or the like. The road surface information server 2 can transmit and receive information to and from a plurality of the vehicles 3.

The road surface information server 2 includes a meteorological information receiver 21, a road surface information creation unit 22, and a road surface information transmitter 23.

The meteorological information receiver 21 receives meteorological information related to the weather. The meteorological information includes weather for each area, rain cloud movements, and forecasts thereof.

The road surface information creation unit 22 creates road surface information based on, for example, meteorological information. The road surface information is, for example, information indicating the state of the road surface for each area, and includes information indicating the high or low probability of slipping for each position of the road surface. In Embodiment 1, description is made assuming that there are two probabilities of slipping, "high" and "low", but values indicating three or more high/low probabilities may be shown. The probability of slipping on the road surface can be determined based on whether or not the road surface is wet from the amount of rainfall or the amount of snowfall. In addition, whether or not the road surface is wet can be determined based on the amount of wiper operation of the vehicle 3 and the position information of the vehicle 3. Further, whether or not the road surface is a slip-prone road surface may be determined with reference to road alignment, such as a sharp curve, or the past slip information, or can also be determined using a combination of the information.

The road surface information transmitter 23 sends the created road surface information. The road surface information transmitter 23 transmits the road surface information to the vehicle 3 in the corresponding area via the network NW. Further, the road surface information transmitter 23 sends the latest road surface information every time the road surface information is updated to the latest information.

The vehicle 3 is an electrified vehicle including a motor 11 for travel, an engine 12, a battery 13, a charger 14, a vehicle-side connector 15, and an inverter 16.

The motor 11 is a power source for travel. Further, the engine 12 can rotate the motor 11. That is, the motor 11 can generate electric power by the power of the engine 12. In a case where the motor 11 generates electric power by the engine 12, the battery 13 can be charged with the electric power generated by the motor 11. The motor 11 is electrically connected to the battery 13 via the inverter 16.

The vehicle 3 is a plug-in hybrid electric vehicle including the charger 14 that charges the battery 13 with electric power from the outside and the vehicle-side connector 15.

The battery 13 is an electric power storage device that stores electric power to be supplied to the motor 11 and that also stores electric power supplied from an external power source. The battery 13 is conductively connected to the vehicle-side connector 15 via the charger 14. The charger 14 charges the battery 13 with electric power from the outside. For example, the charger 14 includes various relay units. The relay units of the charger 14 are opened, whereby the battery 13 and the vehicle-side connector 15 can be electrically disconnected. When the battery 13 is charged with external electric power, the relay units of the charger 14 are closed, and the battery 13 and the vehicle-side connector 15 are electrically connected. The vehicle-side connector 15 can be connected to an external connector, such as a charging connector of a charging station.

In addition, the vehicle 3 includes a global positioning system (GPS) receiver 31, a communication unit 32, a controller 33, a human machine interface (HMI) 34, a powertrain 35, and a storage unit 36.

The GPS receiver 31 receives radio waves (signals) from GPS satellites.

The communication unit 32 transmits and receives information to and from the zone setting information server 4. The communication unit 32 receives a control instruction transmitted from the zone setting information server 4. Further, the communication unit 32 transmits position information indicating the current position of the vehicle 3 to the road surface information server 2.

The controller 33 includes a processor having hardware, such as a central processing unit (CPU), and a storage unit, such as a random access memory (RAM) and a read only memory (ROM). The controller 33 has a position information acquisition unit 33a, a switching controller 33b, an engine controller 33c, an HMI controller 33d, and a powertrain controller 33e.

The position information acquisition unit 33a acquires current position information based on the signal received by the GPS receiver 31.

The switching controller 33b controls the switching timing between an HV mode in which the vehicle 3 travels using a combination of the engine 12 and the motor 11 and an EV mode in which the vehicle 3 travels using solely the motor 11, based on the road surface information and the geofencing zone.

The engine controller 33c controls the engine 12. For example, in a case where a drive prohibition instruction of the engine 12 is received, the engine controller 33c executes prohibition control for prohibiting the drive of the engine 12. Alternatively, in a case where a drive permission instruction of the engine 12 is received, the engine controller 33c executes permission control for permitting the drive of the engine 12.

The HMI controller 33d controls the HMI 34.

The HMI 34 is formed of, for example, a car navigation device. The HMI 34 is an in-vehicle device that functions as a notification unit which notifies a driver of information and that also functions as an operation unit which receives an operation from the driver. The HMI 34 notifies the driver of information such as that the vehicle 3 is in a controlled state in which the drive of the engine 12 is permitted or that the vehicle 3 is in a controlled state in which the drive of the engine 12 is prohibited, under the control of the HMI controller 33d.

The powertrain controller 33e controls the powertrain 35.

The powertrain 35 is a power transmission device that transmits power output from the motor 11 or the engine 12 to the drive wheels. The powertrain 35 includes an automatic transmission and the like. Therefore, the powertrain controller 33e executes shift control for controlling the shift stage of the automatic transmission.

The storage unit 36 is formed using a computer-readable recording medium, and stores various programs and various data in a writable and readable manner. The recording medium has a storage medium, such as a hard disk, a semiconductor memory, an optical disk, a flash memory, and a magnetic disk, and a drive device for the storage medium. The storage unit 36 stores programs of various applications and an operating system (OS) needed for the controller 33 to control the operation of each unit of the vehicle 3 in an integrated manner.

Further, the controller 33 controls the motor 11 by controlling the inverter 16.

For the inverter 16, switching control is performed by the controller 33. Furthermore, for the relay unit of the charger 14, open/close control is performed by the controller 33. That is, the controller 33 executes charge control for charging the battery 13 with electric power from the outside, and also executes discharge control for supplying the electric power stored in the battery 13 to the outside. Further, the controller 33 executes various control related to the vehicle 3.

The zone setting information server 4 outputs the setting information of the geofencing zone. In the setting information, the information of the area where the geofencing zone is set is set as map information and coordinate information.

Figure 4:
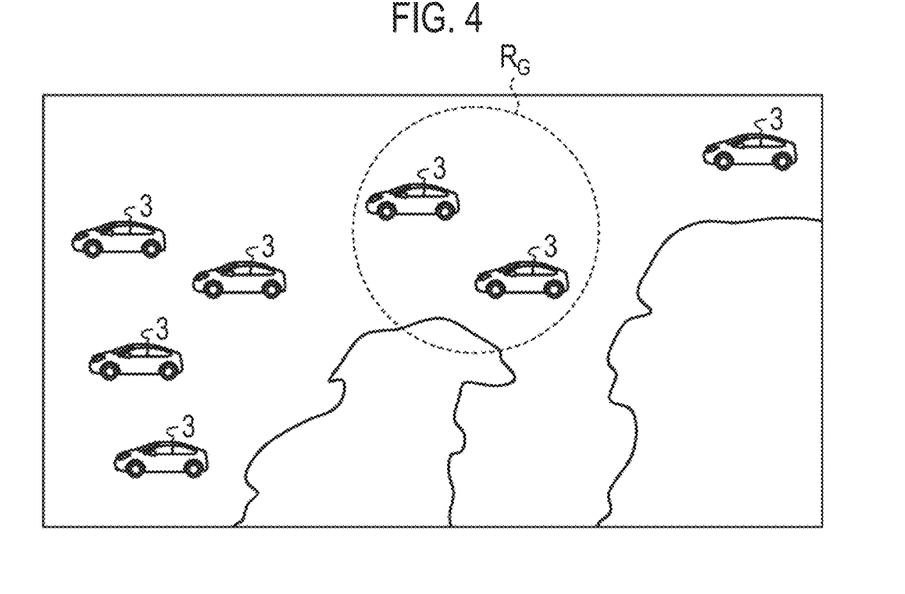
FIG. 4 is a diagram illustrating a geofencing zone.

Here, a virtual fence (virtual perimeter) called geofencing is set in a predetermined area (geofencing zone). The geofencing zone is set for a specific area, such as an urban area. In the geofencing zone, specific vehicle control is executed for the vehicle 3 located in the geofencing zone. The vehicle control includes drive control for prohibiting engine drive so that the vehicle travels solely by the motor (EV travel). FIG. 4 is a diagram illustrating the geofencing zone. For example, the drive prohibition instruction for the engine 12 is transmitted to the vehicle 3 located in the geofencing zone $R_G$ shown in FIG. 4.

Figure 5:
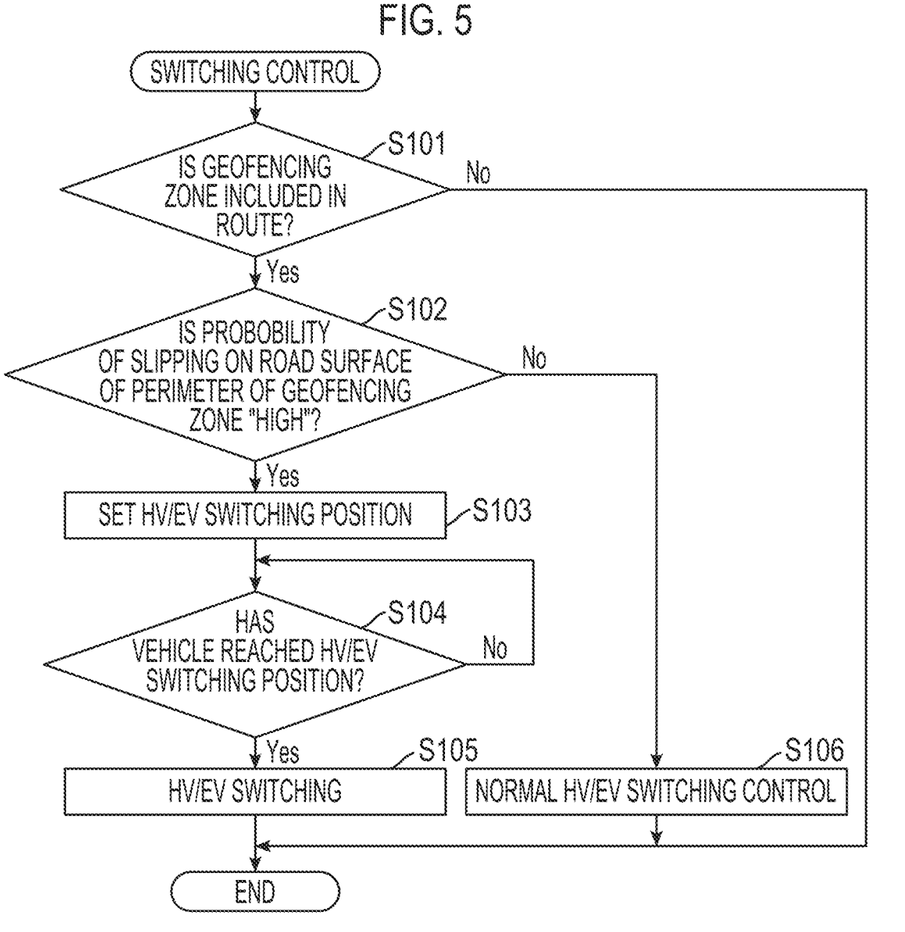
FIG. 5 is a flowchart showing an example of vehicle control processing according to Embodiment 1.

Here, HV/EV switching control executed by the controller 33 of each vehicle 3 will be described with reference to FIG. 5. The control shown in FIG. 5 is repeatedly executed by the controller 33, for example, in a case where a route is set by a navigation system. FIG. 5 is a flowchart showing an example of vehicle control processing according to Embodiment 1. In FIG. 5, description is made assuming that a route to enter the inside of the geofencing zone from the outside of the geofencing zone is set.

The controller 33 determines whether or not the geofencing zone is included in the route, based on the travel route set by the HMI 34 and the position information of the geofencing zone acquired from the zone setting information server 4 (step S101). The controller 33 ends the HV/EV switching control in a case where the geofencing zone is not included in the route (step S101: No). The controller 33 proceeds to step S102 in a case where the geofencing zone is included in the route (step S101: Yes).

In step S102, the switching controller 33b determines whether or not there is a high probability of slipping on the road surface at the perimeter of the geofencing zone. The switching controller 33b determines whether or not there is a high probability of slipping at the perimeter between the inside of the geofencing zone and the outside of the geofencing zone, particularly a region near the perimeter including the perimeter through which the travel route passes, based on the road surface information and the geofencing zone. In a case where the switching controller 33b determines that there is a low probability of slipping on the road surface at the perimeter of the geofencing zone (step S102: No), the switching controller 33b proceeds to step S106. In contrast, in a case where the switching controller 33b determines that there is a high probability of slipping on the road surface at the perimeter of the geofencing zone (step S102: Yes), the switching controller 33b proceeds to step S103.

In step S103, the switching controller 33b sets a position (HV/EV switching position) where the HV mode and the EV mode are switched. The switching controller 33b sets, for example, a position where there is a low probability of slipping on the road surface in the route and which is closest to the geofencing zone to the HV/EV switching position, based on the road surface information. The HV/EV switching position is not limited to the position on the map, and may be, for example, an intersection at the timing at which the vehicle 3 is stopped.

Then, the controller 33 determines whether or not the vehicle 3 has reached the HV/EV switching position set in step S103 (step S104). The controller 33 determines whether or not the vehicle 3 has reached the HV/EV switching position by referring to the position information acquired by the position information acquisition unit 33a. In a case where the controller 33 determines that the vehicle 3 has not reached the HV/EV switching position (step S104: No), the controller 33 repeats the confirmation that the vehicle 3 has reached the HV/EV switching position. On the other hand, in a case where the controller 33 determines that the vehicle 3 has reached the HV/EV switching position (step S104: Yes), the controller 33 proceeds to step S105.

In step S105, the switching controller 33b switches the HV mode to the EV mode at the HV/EV switching position. By the switching processing, the HV/EV switching processing is executed at a position outside the geofencing zone and closest to the geofencing zone, where there is a low probability of slipping on the road surface.

Further, in step S106, the switching controller 33b performs normal HV/EV switching. Here, the switching processing from the HV mode to the EV mode is executed at the perimeter between the inside of the geofencing zone and the outside of the geofencing zone.

In Embodiment 1 described above, in a case where there is a high probability of slipping on the road surface in the HV/EV switching from the outside of the geofencing zone to the inside of the geofencing zone, the HV/EV switching is performed at a position outside the geofencing zone, where there is a low probability of slipping on the road surface. According to Embodiment 1, since the HV/EV switching is executed at a position where the road surface is not wet, it is possible to restrain the slip of the vehicle caused by the change in torque when the drive by the internal combustion engine (engine 12) is switched to the drive by the motor (motor 11).

Embodiment 2

Figure 6:
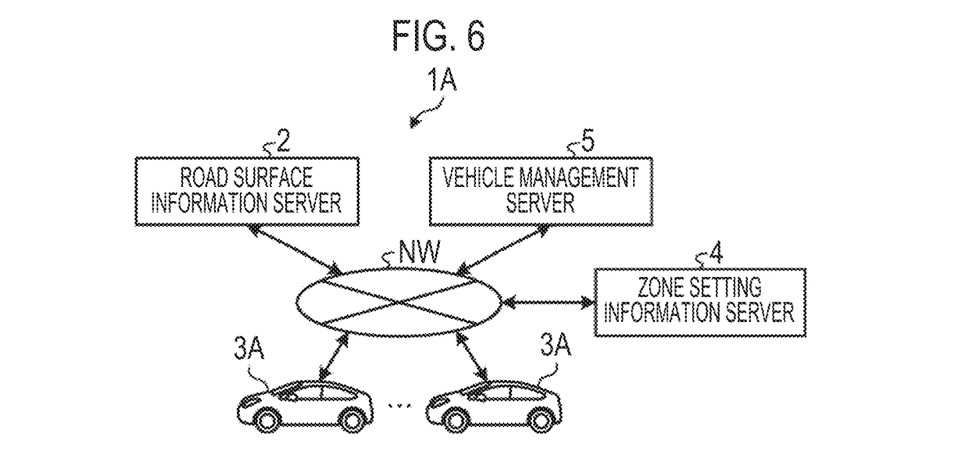
FIG. 6 is a diagram schematically showing a control system according to Embodiment 2.
Figure 7:
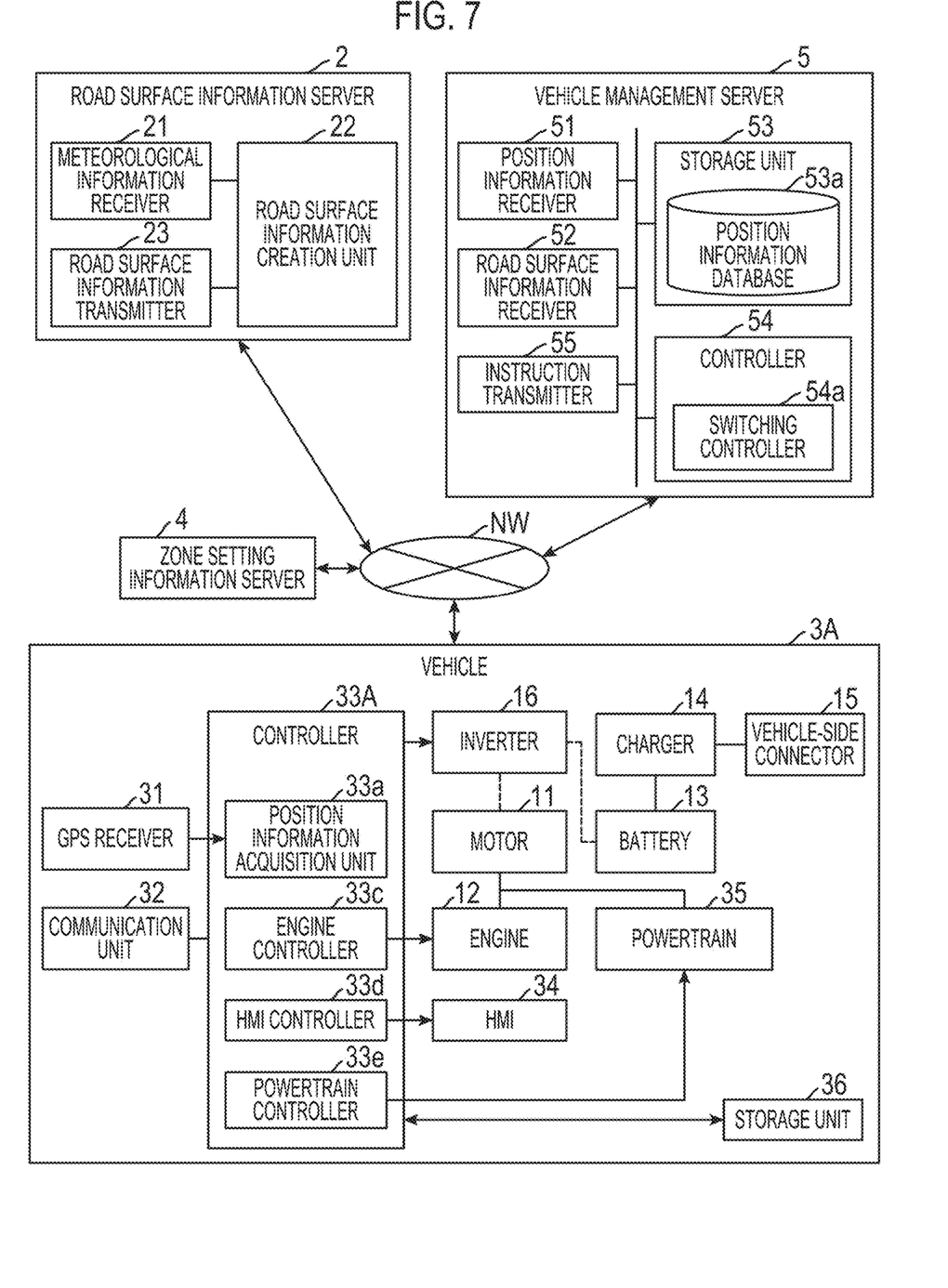
FIG. 7 is a block diagram illustrating a configuration of the control system according to Embodiment 2.

Next, Embodiment 2 will be described. FIG. 6 is a diagram schematically showing a control system according to Embodiment 2. FIG. 7 is a block diagram illustrating the configuration of the control system according to Embodiment 2. A control system 1A according to Embodiment 2 includes a vehicle 3A instead of the vehicle 3 with respect to the configuration of the control system 1 according to Embodiment 1, and further includes a vehicle management server 5. Hereinafter, parts different from Embodiment 1 (configurations and processing contents of the vehicle 3A and the vehicle management server 5) will be described.

The control system 1A includes the road surface information server 2, the vehicle 3A, the zone setting information server 4, and the vehicle management server 5. The vehicle 3A has a configuration in which a controller 33A having no switching controller 33b is provided, with respect to the configuration of the vehicle 3.

The vehicle management server 5 is a server installed in a vehicle management center. The vehicle management center monitors the position information of the vehicle 3A in real time, for a plurality of vehicles 3A.

The road surface information server 2 and the vehicle management server 5 can perform information communication via the network NW. The network NW is formed of, for example, the network of the Internet or the like. Further, the vehicle 3A and the vehicle management server 5 can perform wireless communication via the network NW.

The vehicle management server 5 includes a position information receiver 51, a road surface information receiver 52, a storage unit 53, a controller 54, and an instruction transmitter 55.

The position information receiver 51 receives current position information transmitted from the vehicle 3A. The vehicle management server 5 can receive the position information of the vehicle 3A transmitted from each of the vehicles 3A by the position information receiver 51.

The road surface information receiver 52 receives disaster area information transmitted from the road surface information server 2. The road surface information receiver 52 can communicate with the road surface information transmitter 23 via the network NW.

The storage unit 53 stores various information for managing the vehicle 3A. For example, the storage unit 53 stores information regarding an area in which a geofencing zone is set. The geofencing information is pre-stored information. Further, the storage unit 53 has a position information database 53a.

The position information database 53a stores the position information of the vehicle 3A. The position information regarding the vehicles 3A is stored in the position information database 53a in real time, based on the position information received by the position information receiver 51. That is, the position information stored in the position information database 53a is updated to the latest position information at any time.

The controller 54 includes a processor having hardware, such as a CPU. Further, the controller 54 has a switching controller 54a.

The controller 54 specifies the vehicle 3A located in the geofencing zone. For example, the controller 54 specifies the vehicle 3A located in the geofencing zone based on the geofencing information stored in the storage unit 36 and the position information stored in the position information database 53a. The controller 54 executes specific vehicle control (control program) for the specified vehicle 3A.

The instruction transmitter 55 transmits a control instruction for executing the specific vehicle control to the vehicle 3A. Examples of the control instruction for a target vehicle includes an instruction for prohibiting the drive of the engine 12 inside the geofencing zone (engine drive prohibition instruction) or an instruction for permitting the drive of the engine 12 outside the geofencing zone (engine drive permission instruction), and HV/EV switching control.

In Embodiment 2, the vehicle management server 5 acquires road surface information from the road surface information server 2, and the switching controller 54*a* performs the timing control of HV/EV switching for the vehicle 3A located inside or outside the geofencing zone. Specifically, the switching controller 54*a* executes the processing shown in FIG. 5 for each vehicle 3A, and outputs an HV/EV switching instruction to each vehicle 3A.

In Embodiment 2 described above, in a case where there is a high probability of slipping on the road surface in the HV/EV switching from the outside of the geofencing zone to the inside of the geofencing zone, the HV/EV switching is performed at a position outside the geofencing zone, where there is low probability of slipping on the road surface. According to Embodiment 2, since the HV/EV switching is executed at a position where the road surface is not wet, it is possible to restrain the slip of the vehicle caused by the change in torque when the drive by the internal combustion engine (engine 12) is switched to the drive by the motor (motor 11).

Further, in Embodiment 2, since the switching controller 54*a* collectively provides instructions of the HV/EV switching control for the vehicles 3A, it is not needed for each vehicle 3A to execute the processing for the HV/EV switching control. Therefore, it is possible to reduce the processing load of the vehicle 3A and restrain the battery 13 of the vehicle 3A from running low.

In the embodiments described above, for example, the road surface information server 2 can detect meteorological information based on information posted on a posting site or the like on the Internet or information sent by a public institution, such as a local government. For example, in a case where information posted on a posting site or the like on the Internet is used, the road surface information server 2 detects the information via the network NW. Specifically, a configuration may be adopted in which information indicating rainfall is detected based on a word posted on a social networking service (SNS) on the Internet or a word frequently tweeted on Twitter (registered trademark) on a certain day.

Further, the HMI 34 is not limited to the car navigation device, and may be a device that functions as a notification unit capable of transmitting information by the driver's sight, hearing, or perception. For example, the HMI 34 may be a voice device, such as an audio, capable of providing notification by voice, or a device that generates vibration in the driver's seat of the vehicle 3.

Recording Medium

In one embodiment, a program capable of executing the processing method by the control system can be recorded on a recording medium readable by a computer or other machines or devices (hereinafter, referred to as a computer or the like). The program on the recording medium is read to and executed on the computer or the like, whereby the computer or the like functions as a controller of each device of the control system. Here, the recording medium that is readable by the computer or the like refers to a non-transitory recording medium on which information, such as data or programs, can be accumulated by an electrical, magnetic, optical, mechanical, or chemical action and can be read through the computer or the like. Among such recording mediums, examples of recording mediums that are removable from the computer or the like include a flexible disk, a magneto-optical disk, a CD-ROM, a CD-R/W, a digital versatile disk (DVD), a Blu-ray (registered trademark) disc (BD), a digital audio tape (DAT), a magnetic tape, and a memory card, such as a flash memory. Examples of recording mediums that are fixed in the computer or the like include a hard disk and a ROM. In addition, an SSD is available as a recording medium that is removable from the computer or the like or as a recording medium that is fixed in the computer or the like.

OTHER EMBODIMENTS

In the control system according to one embodiment, a "unit" can be replaced with a "circuit" or the like. For example, the communication unit can be replaced with a communication circuit.

The program that is executed by each device of the control system according to one embodiment may be provided by storing the program on a computer connected to a network, such as the Internet, and downloading the program by way of the network.

Other effects or modification examples can be easily derived by those skilled in the art. Broader aspects of the present disclosure are not limited to specific details and representative embodiments shown and described above. Accordingly, various changes can be made without departing from the gist or scope of the general inventive concept defined by the appended claims and equivalent thereof.

What is claimed is:

1. A vehicle control device configured to control switching of a drive mode of a vehicle including an internal combustion engine and a motor, the vehicle control device comprising a processor configured to switch, in a case where a road surface of a perimeter of a geofencing zone is a road surface on which there is a high probability that the vehicle slips, in a movement route from an outside of the geofencing zone to an inside of the geofencing zone, the drive mode of the vehicle to drive by the motor in a state in which there is a low probability that the vehicle slips, outside the geofencing zone, the geofencing zone being set by a virtual perimeter in which travel of the vehicle is restricted to travel by a power of the motor.

2. The vehicle control device according to claim 1, wherein the processor is configured to switch the drive mode of the vehicle to the drive by the motor at a position where is outside the geofencing zone and where there is the low probability that the vehicle slips.

3. The vehicle control device according to claim 2, wherein the processor is configured to switch the drive mode of the vehicle to the drive by the motor at a position outside the geofencing zone and closest to the geofencing zone, out of positions where there is a low probability that the vehicle slips.

4. The vehicle control device according to claim 1, wherein the processor is configured to switch the drive mode of the vehicle to the drive by the motor while the vehicle is stopped at a position outside the geofencing zone.

5. The vehicle control device according to claim 1, wherein the processor is configured to control a switching position to the drive by the motor in the vehicle to a position where there is the low probability that the vehicle slips, in a case where a travel route is set in the vehicle and the travel route passes through the geofencing zone.

6. The vehicle control device according to claim 5, wherein the processor is configured to determine whether or not a road surface on the travel route is the road surface on which there is the high probability that the vehicle slips, based on the travel route set in the vehicle and road surface information acquired in the vehicle.

7. The vehicle control device according to claim 6, wherein the road surface information is based on at least one of an amount of rainfall, an amount of wiper operation, and road alignment.

8. A non-transitory storage medium storing instructions that are executable by a processor of a vehicle control device that is configured to control switching of a drive mode of a vehicle including an internal combustion engine and a motor, the instructions causing the processor to perform functions comprising switching, in a case where a road surface of a perimeter of a geofencing zone is a road surface on which there is a high probability that the vehicle slips, in a movement route from an outside of the geofencing zone to an inside of the geofencing zone, the drive mode of the vehicle to drive by the motor in a state in which there is a low probability that the vehicle slips, outside the geofencing zone, the geofencing zone being set by a virtual perimeter in which travel of the vehicle is restricted to travel by a power of the motor.

9. The non-transitory storage medium according to claim 8, wherein in the switching to the drive by the motor, the drive mode of the vehicle is switched to the drive by the motor at a position where is outside the geofencing zone and where there is the low probability that the vehicle slips.

10. The non-transitory storage medium according to claim 9, wherein in the switching to the drive by the motor, the drive mode of the vehicle is switched to the drive by the motor at a position outside the geofencing zone and closest to the geofencing zone, out of positions where there is the low probability that the vehicle slips.

11. The non-transitory storage medium according to claim 8, wherein in the switching to the drive by the motor, the drive mode of the vehicle is switched to the drive by the motor while the vehicle is stopped at a position outside the geofencing zone.

12. The non-transitory storage medium according to claim 8, wherein in the switching to the drive by the motor, a switching position to the drive by the motor in the vehicle is controlled to a position where there is the low probability that the vehicle slips, in a case where a travel route is set in the vehicle and the travel route passes through the geofencing zone.

13. The non-transitory storage medium according to claim 12, wherein the functions further comprises determining whether or not a road surface on the travel route is the road surface on which there is the high probability that the vehicle slips, based on the travel route set in the vehicle and road surface information acquired in the vehicle.

14. A vehicle control system comprising:
a vehicle including an internal combustion engine and a motor; and
a vehicle control device including a processor configured to switch, in a case where a road surface of a perimeter of a geofencing zone is a road surface on which there is a high probability that the vehicle slips, in a movement route from an outside of the geofencing zone to an inside of the geofencing zone, a drive mode of the vehicle to drive by the motor in a state in which there is a low probability that the vehicle slips, outside the geofencing zone, the geofencing zone being set by a virtual perimeter in which travel of the vehicle is restricted to travel by a power of the motor.

15. The vehicle control system according to claim 14, wherein the processor is configured to switch the drive mode of the vehicle to the drive by the motor at a position where is outside the geofencing zone and where there is the low probability that the vehicle slips.

16. The vehicle control system according to claim 15, wherein the processor is configured to switch the drive mode of the vehicle to the drive by the motor at a position outside the geofencing zone and closest to the geofencing zone, out of positions where there is the low probability that the vehicle slips.

17. The vehicle control system according to claim 14, wherein the processor is configured to switch the drive mode of the vehicle to the drive by the motor while the vehicle is stopped at a position outside the geofencing zone.

18. The vehicle control system according to claim 14, wherein the processor is configured to control a switching position to the drive by the motor in the vehicle to a position where there is the low probability that the vehicle slips, in a case where a travel route is set in the vehicle and the travel route passes through the geofencing zone.

19. The vehicle control system according to claim 18, wherein the processor is configured to determine whether or not a road surface on the travel route is the road surface on which there is the high probability that the vehicle slips, based on the travel route set in the vehicle and road surface information acquired in the vehicle.

20. The vehicle control system according to claim 19, wherein the road surface information is based on at least one of an amount of rainfall, an amount of wiper operation, and road alignment.

\* \* \* \* \*